United States Patent [19]

Konishi et al.

[11] Patent Number: 4,553,744
[45] Date of Patent: Nov. 19, 1985

[54] DAMPER DEVICE FOR ENGINE MOUNTINGS OR THE LIKE

[75] Inventors: Keizo Konishi; Teruo Yonehama; Takao Yamamoto, all of Aichi, Japan

[73] Assignee: Tokai Rubber Industries Ltd., Komaki, Japan

[21] Appl. No.: 201,341

[22] Filed: Oct. 27, 1980

[30] Foreign Application Priority Data

Nov. 6, 1979 [JP] Japan ............................ 54-143521

[51] Int. Cl.$^4$ .......................... F16F 9/34; F16F 1/36; F16F 9/10
[52] U.S. Cl. ............................ 267/140.1; 137/513.5; 137/527.8; 138/26; 138/30; 248/562; 280/697
[58] Field of Search ............. 188/298, 322.14, 322.15, 188/317, 282; 267/35, 63 R, 63 A, 113, 140.1, 141, 141.3, 141.4, 141.5, 141.7, 152, 8 R; 248/562; 280/697; 138/30, 26, 31; 220/85 B; 137/513.5, 527, 527.8

[56] References Cited

U.S. PATENT DOCUMENTS

| 879,029 | 2/1908 | Blackburn | 137/513.5 X |
| 922,262 | 5/1909 | Clemens, Jr. | 137/527 X |
| 2,349,322 | 5/1944 | White | 138/30 |
| 3,003,597 | 10/1961 | DeCarbon | 188/317 |
| 4,159,091 | 6/1979 | LeSalver et al. | 248/562 |
| 4,241,816 | 12/1980 | Hubrecht et al. | 188/317 X |

FOREIGN PATENT DOCUMENTS

| 183609 | 10/1955 | Fed. Rep. of Germany | 267/35 |
| 942829 | 11/1963 | United Kingdom | 267/35 |

Primary Examiner—George E. A. Halvosa
Attorney, Agent, or Firm—Anthony J. Casella; Gerald E. Hespos

[57] ABSTRACT

Herein disclosed is a damper device which is so constructed that a main sealed chamber is formed between one mounting member and the other mounting member by an elastic rubber member providing connection in between, that an auxiliary sealed chamber is formed at the opposite side of the other mounting member to the main sealed chamber by an elastic cover, that the main sealed chamber and at least a portion of the auxiliary sealed chamber are charged with a liquid, that the main sealed chamber and the auxiliary sealed chamber are partitioned by such a partition as is made movable in the direction jointing the two chambers and as is arranged to have its movable range restricted, and that a slot passage is formed between said partition and a wall surrounding the latter.

The aforementioned passage is sized to generate in the liquid in the vicinity thereof not when high-frequency vibrations are applied from the one mounting member in the direction joining the two mounting members but when low-frequency vibrations are applied.

The damper device thus constructed has remarkably excellent spring and damping constants.

6 Claims, 4 Drawing Figures

DAMPER DEVICE FOR ENGINE MOUNTINGS OR THE LIKE

BACKGROUND OF THE INVENTION

1. Field of the Invention

The present invention relates to a damper device to be used mainly for mounting an engine.

2. Description of the Prior Art

As the damper device of that kind, there is known in the relevant art the construction which is disclosed in U.S. Pat. No. 4,159,091 to Le Salver et al.

The damper device disclosed is so constructed that an elastic rubber member is sandwiched between a mounting member to a vehicular body and a mounting member to an engine, that a main sealed chamber and an auxiliary chamber are formed therein such that both the former chamber and at least a portion of the latter chamber are charged with a liquid, and that such a partition as is made movable in the direction to join the two chambers and as has its movable range restricted is arranged to partition the main and auxiliary sealed chambers and is formed with an orifice.

In the damper device disclosed in that the above-mentioned U.S. Patent, since the partition separating the main and auxiliary sealed chambers is made movable, the dynamic spring constant in the vicinity of a high-frequency range (of 100 Hz) is far smaller than that of the device having its partition fixed. Thus, that damper device can have desired dynamic spring constant characteristics in the high-frequency range.

However, the flow of the liquid passing through the orifice becomes turbulent even under the condition in which the flow velocity of the liquid passing through the orifice not only for a large amplitude (of ±0.5 mm) in a low-frequency range (in the vicinity of 15 Hz) but also for a small amplitude (of ±0.05 mm) in a high-frequency range is considerably decreased. As a result, it has been found that the damping constants not only in the low-frequency range but also in the high-frequency range become large and accordingly that the vibration-isolation characteristics in the high-frequency range are not satisfactory.

It has also been found that the damping constant in the high-frequency range can be reduced in case that damping device is not formed with the orifice.

More specifically, if the circular orifice is removed from that damping device so that the liquid is made to pass through a slot-shaped passage formed between a partition and a surrounding wall thereof, the liquid flow passing in the high-frequency range is more liable to become laminar than that passing through the circular orifice. As a result, it has further been found the damping constant in the high-frequency range can be made far smaller than that in the case of the circular orifice if the whole effective area of the slot passage for the liquid is made the same as that of the circular orifice. In the low-frequency range, on the other hand, since the flow velocity of the liquid passing through the slot passage is far higher than that of the liquid in the high-frequency range, the liquid flow becomes turbulent similarly to that passing through the circular orifice. It has further been found that the damping constant is as high as that in the case of the circular orifice.

In view of the foregoing description, we, the inventors, have discovered that the cause for enlarging the damping constant in the high-frequency range is attributed to the circular orifice.

SUMMARY OF THE INVENTION

On the basis of the aforementioned findings, the present invention is featured by the construction that the circular orifice is removed from the partition of the damping device to be used for mounting an engine and is replaced by the slot-shaped passage which is formed between the partition and its surrounding wall. This slot passage is sized not to generate any turbulent flow in the vicinity of the passage so as to reduce the damping constant in the high-frequency range, when vibrations in the high-frequency range are applied in the thickness direction of the partition from one of mounting members, but to generate turbulent flow when vibration in the low-frequency range are applied.

The reason why the aforementioned passage is sized to generate no turbulent flow in the liquid in the vicinity thereof when the vibrations in the high-frequency range are applied is because, in case the size of the passage is so made as to generate turbulent flow in the vicinity of the passage when the vibrations in the high-frequency range are applied, i.e., in case the area of the passage is far smaller than the effective area of the conventional circular orifice, the liquid passing through the passage naturally has its flow velocity increased to become turbulent so that it cannot enjoy, in that case, the shape effect of the passage which is formed into a slot shape between the partition and its surrounding wall (i.e., the shape effect being unchanged from that in case the circular orifice is formed), with the resultant large damping constant in the high-frequency range.

By forming the passage which is sized to generate no turbulent flow, the damping constant in the high-frequency range can be reduced, and turbulent flow is generated in the low frequency range is generated similarly to the case of the circular orifice so that the damping constant can be maintained at a large value.

It is therefore an object of the present invention to provide a damping device which can have both a dynamic spring constant and a damping constant reduced in the high-frequency range while retaining such a feature of the prior art that the damping constant in the low-frequency range is large.

DETAILED DESCRIPTION OF THE PREFERRED EMBODIMENTS

Figure 1:
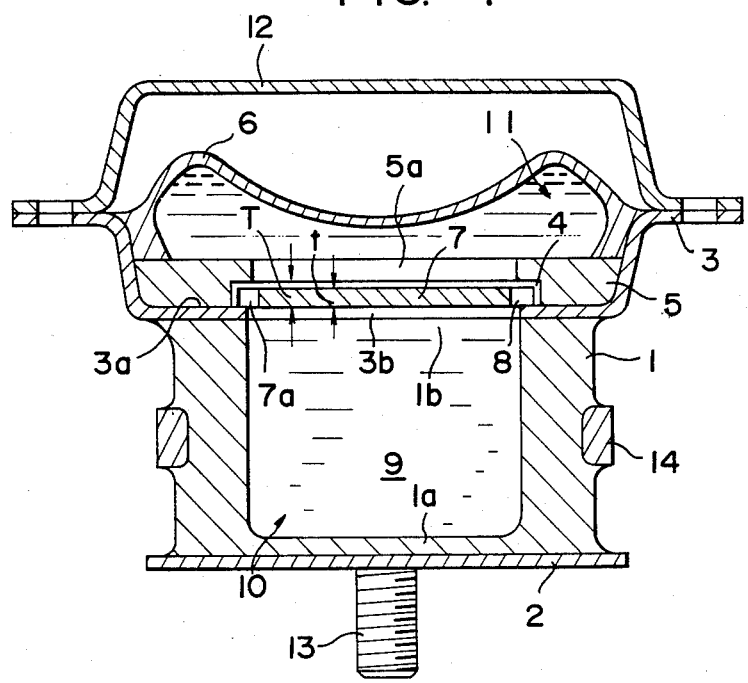
FIG. 1 is a longitudinal section showing a damping device according to one embodiment of the present invention.

An elastic rubber member 1 of cylindrical shape, which has its one end 1a closed, is attached at the end 1a to a flat mounting member 2 to be fixed to a vehicular body. To the other open end 1b of the elastic rubber member 1, there is attached a recessed mounting member 3 which is formed with a recess 3a at its center where it is fixed to an engine. The mounting member 3 is formed in its recess 3a with such an opening 3b as has the same diameter as that of the open end 1b and as is aligned with the open end 1b.

In the recess 3a of the mounting member 3, there is fitted a retainer 5 which is formed both with a circular groove 4 having a larger diameter than the opening 3b and at its center with an open portion 5a having a diameter substantially equal to or slightly smaller than that of the opening 3b. The arrangement of those parts is made such that the open end 1b, the opening 3b, the groove 4 and the open portion 5a are concentric. On one side of the retainer 5, on the other hand, there is mounted an elastic enclosure 6 which has its periphery attached to the retainer 5.

A circular partition 7 is fitted in the groove 4, which is defined between the opening 3b of the mounting member 3 and the open portion 5a of the retainer 5, and is formed with a plurality of (e.g., four in the embodiment shown) legs 7a which project radially from the outer circumference thereof.

The diameter d of the partition 7 is made slightly smaller than the diameter D of the opening 3b or the open portion 5a, and the diametrical distance d' of the legs 7a is made larger than the diameter D of the opening 3b or the open portion 5a but smaller than the diameter D' of the groove 4 so that arcuate slot passages 8 are formed among the outer circumference of the partition 7, the open portion 5a and the opening 3b. Moreover, the partition 7 has a thickness t smaller than the depth T of the groove 4 so that it can move slightly in its thickness and diametrical directions while being held in the groove 4.

The space, which is defined by the closed on end 1a, the elastic rubber member 1, the retainer 5 and the enclosure 6, is charged either wholly or partially while leaving a gasseous portion with a liquid 9 and is divided by that partition 7 into a main sealed chamber 10 and an auxiliary sealed chamber 11.

To the mounting member 3, there is attached a cover 12 which has generally the same shape as that of the mounting member 3 so that it partly protects the enclosure 6 and partly restricts the deformation range of the same. At the mounting member 2, on the other hand, there is anchored a bolt 13 by which the mounting member 2 is fixed to the body of an automobile.

On the outer periphery of the elastic rubber member 1, on the other hand, there is fitted a ring 14, by which the elastic rubber member 1 is restrained from bulging or being outwardly deformed, when it is compressed by such an external force as will narrow the spacing between the two mounting members 2 and 3, thereby to increase the volumetric change of the main sealed chamber 10.

Figure 3:
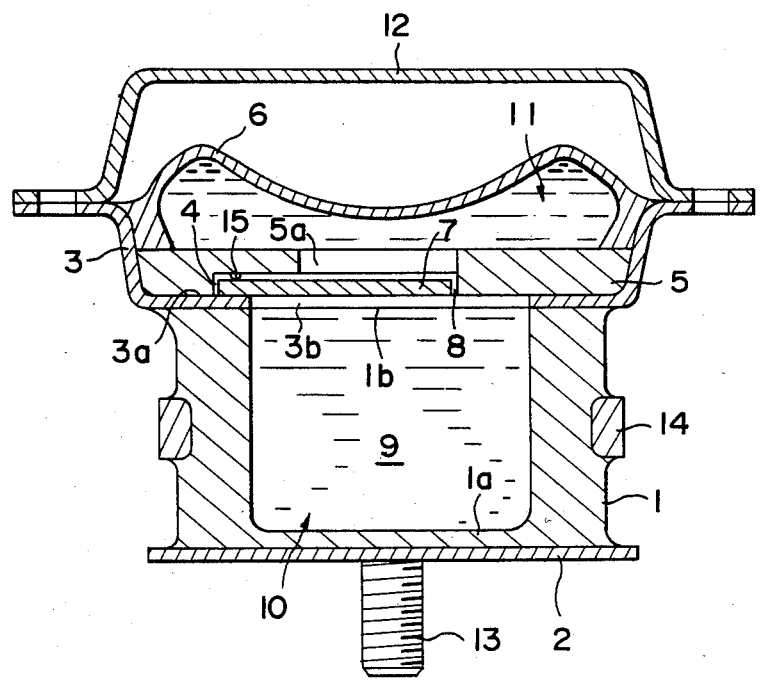
FIG. 3 is a longitudinal section showing a damping device according to another embodiment of the present invention.
Figure 4:
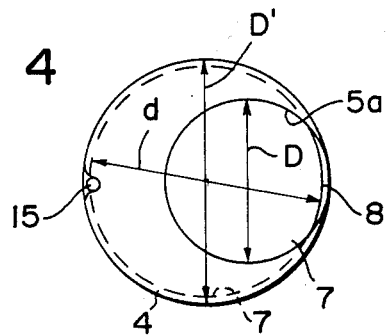
FIG. 4 is similar to FIG. 2 but shows the embodiment of FIG. 3.

The following description is directed to another embodiment of the present invention with reference to FIGS. 3 and 4, in which similar parts to those of the first embodiment are designated at the same reference numerals.

In this second embodiment, the groove 4 is disposed at an eccentric position with respect to the vertical center axis of the elastic rubber member such that its circumference contacts at a point with the circumference of the open portion 5a, whereas the partition 7 has a diameter d slightly smaller than the diameter D' of the groove 4 and slightly larger than the diameter D of the open portion 5a so that a crescent slot passage 8 for providing communication between the main sealed chamber 10 and the auxiliary sealed chamber 11 is formed among a portion of the partition 7, a portion of the opening 3b and a portion of the open portion 5a.

Moreover, the partition 7 is made slightly movable in the diametrical direction, while being held in the groove 4, in a similar manner to the previous embodiment, and the groove 4 is formed with a downwardly projecting projection 15 so that the partition can rock about the projection 15.

Now, when vibrations in a low-frequency range are applied to one mounting member 2 or the other mounting member 3, they expand and compress the elastic rubber member 1, because their amplitude is relatively as large as ±0.5 mm, thus changing the volume of the main sealed chamber 10. As a result of the volumetric change of the main sealed chamber 10, the liquid occupying communicates with that in the auxiliary sealed chamber 11 through the passages 8. The auxiliary sealed chamber 11 is made to allow its volumetric change by the motions of the enclosure 6.

Since, in this embodiment, the passages 8 for providing communication between the main sealed chamber 10 and the auxiliary sealed chamber 11 are formed into the slot shape between the partition 7 and its surrounding wall, as is different from the prior art in which the partition 7 per se is formed with the circular orifice, the fluid passing through said passages 8 is liable to become laminar so that the damping constant is remarkably reduced.

Now, let the case be considered, for example, in which the effective area of the slot passages is made equal to that of the circular orifice according to the prior art. Then, since the amplitude in the low-frequency range becomes as large as ±0.5 mm, the flow velocity is so high as to fail to expect the shape effect of the slot pasages 8, as is similar to the case of the circular orifice according to the prior art, so that the fluid flow passing through the slot passages 8 become turbulent. In the low-frequency range, consequently, the vibrations can be transmitted at a large damping constant to the other mounting member similarly to the case of the circular orifice.

For the vibrations in the high-frequency range, on the contrary, since the amplitude of the vibrations is as small as ±0.05 mm, i.e., about one tenth of the value in the low-frequency range, the flow velocity of the fluid passing through the slot passages 8 is low in the effective area of the passages 8 is the same as that of the conventional circular orifice. As a result, the shape effect of the slot passages 8 can be expected, and the fluid flow passing through the slot passages 8 becomes laminar, as is different from the case of the circular orifice, so that the damping constant at that time can be made remarkably small.

In the present invention, moreover, since the partition 7 is made movable in its thickness direction, the vibrations in the high-frequency range are absorbed so that the dynamic damping constant in that frequency range is small.

Figure 2:
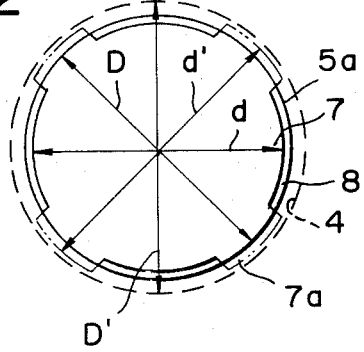
FIG. 2 is a top plan view showing the relationship between the partition of FIG. 1 and a surrounding wall retaining the partition.

Although the embodiment shown in FIGS. 3 and 4 is constructed such that the partition 7 is formed at a portion of its side with the slot-shaped passage 8, as has been described before, it is not substantially different in the effects from the embodiment shown in FIGS. 1 and 2.

The examples of the present invention will be described in the following:

EXAMPLE 1

In this Example, the damping device of FIGS. 1 and 2 was used. Morespecifically, the device was constructed such that the retainer formed with a diameter of 57 mm and a thickness of 5 mm and with the open portion having a diameter of 44 mm was attached to the elastic member which was formed with the main sealed chamber having an outside diameter of 70 mm and an inside diameter of 46 mm and which was made of such rubber of Hs=45 degrees as was composed mainly of natural rubber, such that the enclosure made of the same material as that of the aforementioned elastic member was provided, such that the partition having a diameter of 43 mm, a thickness of 4 mm and a inter-leg diametrical spacing of 56 mm was fitted in the groove, and such that the elastic rubber member was charged with usual water. The data obtained for the damping device having the construction thus far described were tabulated in the following table.

TABLE 1

| | |
|---|---|
| Static Spring Constant | $k_s = 26.5$ Kg/mm |
| Dynamic Spring Constant for Vibrations of 15 Hz | $k_{15}{}^d = 34.8$ Kg/mm |
| Dynamic Spring Constant for Vibrations of 100 Hz | $k_{100}{}^d = 23.5$ Kg/mm |
| Damping Constant for Vibrations of 15 Hz | $c_{15} = 0.132$ Kg · sec/mm |
| Damping Constant for Vibrations of 100 Hz | $c_{100} = 0.008$ Kg · sec/mm |

EXAMPLE 2

In this Example, the damping device of FIGS. 3 and 4 was used. More specifically, the support was constructed such that the retainer formed with the groove having a diameter of 40 mm and a thickness of 5 mm and with the open portion having a diameter of 35 mm was attached to the elastic member having the same size and made of the same rubber as those of the Example 1, such that the enclosure made of the same material as that of the aforementioned elastic member was provided, such that the partition having a diameter of 39 mm and a thickness of 4 mm was fitted in the groove, and such that the elastic rubber member was charged with usual water.

The data obtained for the damping device having the construction thus far described were tabulated in the following table.

TABLE 2

| | |
|---|---|
| Static Spring Constant | $k_s = 26.5$ Kg/mm |
| Dynamic Spring Constant for Vibrations of 15 Hz | $k_{15}{}^d = 34.5$ Kg/mm |
| Dynamic Spring Constant for Vibrations of 100 Hz | $k_{100}{}^d = 31.3$ Kg/mm |
| Damping Constant for Vibrations of 15 Hz | $c_{15} = 0.143$ Kg · sec/mm |
| Damping Constant for Vibrations of 100 Hz | $c_{100} = 0.012$ Kg · sec/mm |

We claim:

1. A damping device comprising:
   an elastic member having first and second opposed ends and a generally cylindrical first chamber extending into the first end thereof;
   a first mounting member affixed to said first end of said elastic member and having a circular opening with a diameter substantially equal to the diameter of said cylindrical first chamber, said circular opening being concentric with said cylindrical first chamber;
   a second mounting member affixed to the second end of said elastic member;
   a retainer adjacent said first mounting member and on the side thereof opposite said elastic member, said retainer having a shallow cylindrical indentation extending partially into the surface of said retainer adjacent said first mounting member, said shallow cylindrical indentation being defined by a substantially planar bottom wall and a cylindrical side wall, said indentation being partially adjacent and eccentric with said circular opening in said first mounting member, said retainer further including a circular through aperture extending through a portion of said indentation adjacent said circular opening in said first mounting member, said circular through aperture in said retainer being internally tangent with a portion of said shallow cylindrical indentation of said retainer adjacent said circular opening in said first mounting member;
   an elastic cover attached to said first mounting member in said retainer, said elastic cover defining a second chamber; and
   a substantially circular partition having a continuous central portion disposed in and slightly movable in said indentation in said retainer, the perimeter of said partition being such that a creseent shaped peripheral slot is defined between the perimeter of said partition and both the circular opening in said first mounting member and the through aperture in said retainer, said crescent shaped peripheral slot providing continuous communication between the first and second chambers.

2. A device according to claim 1, wherein said elastic means is covered with a cover having generally the same shape as that of one of said mounting members.

3. A device according to claim 1, wherein said elastic member has a ring on its outer periphery.

4. A device according to claim 1, wherein said partition is made slightly movable in both the radial and thickness directions.

5. A device according to claim 1, wherein a projection is disposed on the bottom wall of said indentation, said partition having one side rockable about said projection disposed in said indentation.

6. A device according to claim 1, wherein said elastic member is substantially made of rubber.

* * * * *